(12) United States Patent
Zhang et al.

(10) Patent No.: US 12,373,643 B2
(45) Date of Patent: Jul. 29, 2025

(54) EFFICIENT ZERO SHOT EVENT EXTRACTION WITH CONTEXT DEFINITION

(71) Applicant: TENCENT AMERICA LLC, Palo Alto, CA (US)

(72) Inventors: Hongming Zhang, Mill Creek, WA (US); Wenlin Yao, Palo Alto, CA (US); Dong Yu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 286 days.

(21) Appl. No.: 18/077,685

(22) Filed: Dec. 8, 2022

(65) Prior Publication Data

US 2024/0193362 A1    Jun. 13, 2024

(51) Int. Cl.
| | |
|---|---|
| G06F 40/284 | (2020.01) |
| G06F 16/334 | (2025.01) |
| G06F 40/237 | (2020.01) |
| G06F 40/279 | (2020.01) |
| G06F 40/30 | (2020.01) |

(52) U.S. Cl.
CPC ........ G06F 40/284 (2020.01); G06F 16/3344 (2019.01); G06F 40/30 (2020.01); *G06F 40/237* (2020.01); *G06F 40/279* (2020.01)

(58) Field of Classification Search
None
See application file for complete search history.

(56) References Cited

U.S. PATENT DOCUMENTS

| | | | |
|---|---|---|---|
| 10,853,580 B1 * | 12/2020 | Amrite | ................ G06N 3/08 |
| 2007/0106493 A1 * | 5/2007 | Sanfilippo | ............... G06F 40/30 |
| | | | 704/9 |
| 2008/0201133 A1 | 8/2008 | Cave et al. | |
| 2009/0292685 A1 | 11/2009 | Liu et al. | |

(Continued)

FOREIGN PATENT DOCUMENTS

CN    115375781 A    * 11/2022

OTHER PUBLICATIONS

Le-Khac, Phuc H., Graham Healy, and Alan F. Smeaton. "Contrastive representation learning: A framework and review." Ieee Access 8 (2020): 193907-193934. (Year: 2020).*

(Continued)

*Primary Examiner* — Andrew C Flanders
*Assistant Examiner* — Theodore Withey
(74) *Attorney, Agent, or Firm* — Sughrue Mion, PLLC (57) ABSTRACT

A method for zero-shot event extraction, performed by a computer device. The method includes training a context encoder, a first definition encoder, and a second definition encoder with auto extracted context-definition alignment data; retrieving a plurality of verbal synsets from a lexical database; refining a representation model based on the context-definition alignment data and the plurality of verbal synsets; encoding a plurality of candidate event type definitions; encoding the refined representation model with the trained context encoder; and determining whether the encoded representation model belongs to one of the plurality of candidate event type definitions based on a cosine similarity between the encoded representation model, the trained context encoder, the first trained definition encoder, and the second trained definition encoder.

18 Claims, 5 Drawing Sheets

(56) References Cited

U.S. PATENT DOCUMENTS

| | | | |
|---|---|---|---|
| 2009/0299999 A1 | 12/2009 | Loui et al. | |
| 2013/0151235 A1 | 6/2013 | Och et al. | |
| 2014/0161322 A1 | 6/2014 | Cheng et al. | |
| 2019/0065492 A1 | 2/2019 | Cheng et al. | |
| 2020/0142867 A1* | 5/2020 | Ma | G06F 16/9027 |
| 2020/0210520 A1* | 7/2020 | Akyamac | G06F 40/177 |
| 2021/0133251 A1* | 5/2021 | Tiwari | G06F 40/205 |
| 2021/0365306 A1* | 11/2021 | Haldar | G06F 16/9024 |
| 2023/0094730 A1* | 3/2023 | Zhang | G06F 40/186 |
| | | | 704/9 |
| 2023/0132090 A1* | 4/2023 | Yao | G06F 40/216 |
| | | | 704/9 |
| 2023/0274098 A1* | 8/2023 | Syeda-Mahmood | G06N 5/02 |
| | | | 704/9 |

OTHER PUBLICATIONS

International Search Report issued Jun. 14, 2023 in International Application No. PCT/US 23/15299.
Written Opinion issued Jun. 14, 2023 in International Application No. PCT/US 23/15299.

\* cited by examiner

| Model | Identification | | | Identification+Classification | | |
|---|---|---|---|---|---|---|
| | P | R | F1 | P | R | F1 |
| Chance Performance | 19.33 | 20.05 | 19.68 | 0.11 | 0.11 | 0.11 |
| Most Popular Event Type | 18.59 | 19.45 | 19.01 | 0.74 | 0.77 | 0.75 |
| QA (Du and Cardie, 2020) | 19.76 | 45.18 | 27.49 | 4.19 | 9.58 | 5.83 |
| TE (Lyu et al., 2021) | 20.20 | 32.83 | 25.01 | 4.59 | 7.46 | 5.68 |
| WSD (Yao et al., 2021) | 24.66 | 80.52 | 37.76 | 5.36 | 17.51 | 8.21 |
| CLE (Zhang et al., 2021) | 55.07 | 14.63 | 23.00 | 42.99 | 11.34 | 17.95 |
| ZED | 59.37 | 42.28 | 49.39 | 39.63 | 28.22 | 32.96 |

EFFICIENT ZERO SHOT EVENT EXTRACTION WITH CONTEXT DEFINITION

FIELD

The disclosure relates to a three-stage event representation learning framework for event extraction from text.

BACKGROUND OF THE INVENTION

Event extraction, the task of identifying event mentions from documents and classifying them into pre-defined event types, is a fundamental NLP. As a centric information extraction task, event extraction is the foundation of a series of event-centric NLP applications including event relation extraction, event schema induction, and missing event prediction.

Traditional event extraction efforts mostly focus on learning to identify and classify events under a supervised learning setting, where a pre-defined event ontology and large-scale expert annotations is available. However, the learned supervised models cannot be easily applied to new event types out of the pre-defined ontology, limiting these models' usage in real applications.

SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

This disclosure provides a method for zero-shot event extraction.

According to some embodiments, there is provided a method for zero-shot event extraction performed by at least one processor. The method includes training a context encoder, a first definition encoder, and a second definition encoder with auto extracted context-definition alignment data. The method further includes retrieving a plurality of verbal synsets from a lexical database. The method further includes refining a representation model based on the context-definition alignment data and the plurality of verbal synsets. The method further includes encoding a plurality of candidate event type definitions. The method further includes encoding the refined representation model with the trained context encoder. The method further includes determining whether the encoded representation model belongs to one of the plurality of candidate event type definitions based on a cosine similarity between the encoded representation model, the trained context encoder, the first trained definition encoder, and the second trained definition encoder.

According to some embodiments, an apparatus includes at least one memory configured to store program code and at least one processor configured to read the program code and operate as instructed by the program code. The program code includes training code configured to cause the at least one processor to train a context encoder, a first definition encoder, and a second definition encoder with auto extracted context-definition alignment data. The program code further includes retrieving code configured to cause the at least one processor to retrieve a plurality of verbal synsets from a lexical database. The program code further includes refining code configured to cause the at least one processor to refine a representation model based on the context-definition alignment data and the plurality of verbal synsets. The program code further includes first encoding code configured to cause the at least one processor to encode a plurality of candidate event type definitions. The program code further includes second encoding code configured to cause the at least one processor to encode the refined representation model with the trained context encoder. The program code further includes determining code configured to cause the at least one processor to determine whether the encoded representation model belongs to one of the plurality of candidate event type definitions based on a cosine similarity between the encoded representation model, the trained context encoder, the first trained definition encoder, and the second trained definition encoder.

According to some embodiments, a non-transitory computer-readable storage medium, stores instructions that, when executed by at least one processor, cause the at least one processor to train a context encoder, a first definition encoder, and a second definition encoder with auto extracted context-definition alignment data. The instructions further cause the at least one processor to retrieve a plurality of verbal synsets from a lexical database. The instructions further cause the at least one processor to refine a representation model based on the context-definition alignment data and the plurality of verbal synsets. The instructions further cause the at least one processor to encode a plurality of candidate event type definitions. The instructions further cause the at least one processor to encode the refined representation model with the trained context encoder. The instructions further cause the at least one processor to determine whether the encoded representation model belongs to one of the plurality of candidate event type definitions based on a cosine similarity between the encoded representation model, the trained context encoder, the first trained definition encoder, and the second trained definition encoder.

Additional embodiments will be set forth in the description that follows and, in part, will be apparent from the description, and/or may be learned by practice of the presented embodiments of the disclosure.

DETAILED DESCRIPTION OF THE INVENTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Large-scale pre-trained language models have demonstrated strong semantics representation capabilities and motivated a series of works to extract events in a zero-shot setting. Some existing solutions propose to manually design templates for each event type to convert the event extraction problem into a question answering (QA) task and then leverage QA models to extract events. Following that, other existing solutions propose to verbalize candidate triggers and event types into hypothesis and premises, and leverage pre-trained textual entailment models to extract events. However, these models heavily rely on the template design and often suffer from the domain shifting problem between the original training task and the new task. Moreover, as these models require jointly encoding the event mentions and event types, the time complexity is O(N*T), where N is the number of event mention candidates and T is the number of event types. Considering the low inference speed and high computation cost of inference with a deep model, such complexity could be a massive burden for real-time EE systems.

To avoid manually designing templates and to improve the inference efficiency, another solution tries to leverage pre-trained language representation models (i.e., BERT) to acquire a contextualized event type representation. The model can decouple the mention and label representations during the inference time and predict the candidate trigger to the most similar event type based on the cosine similarity. As a result, this method could significantly reduce the inference time complexity from O(N*T) to O(N+T). However, as the experiments show, using only the label name might not lead to a good event type representation because the selected words could be ambiguous.

The present disclosure follows the trend of representation learning and moves forward from representing each event type with a single name to a definition sentence. Specifically, a three-stage event representation learning framework is proposed. In the offline pre-training phase, auto-extracted context-definition alignments are leveraged to learn a definition encoding model that can encode the contextualized mentions and definitions into the same embedding space. In the second warm-up phase, target event types are used to retrieve hard negative examples to further polish the model. In the end, the present disclosure identifies and classifies event mentions based on the cosine similarity between the mention representation and corresponding event type representations. As the proposed system is a disjoint model, the inference time complexity is also O(N+T).

Figure 1:
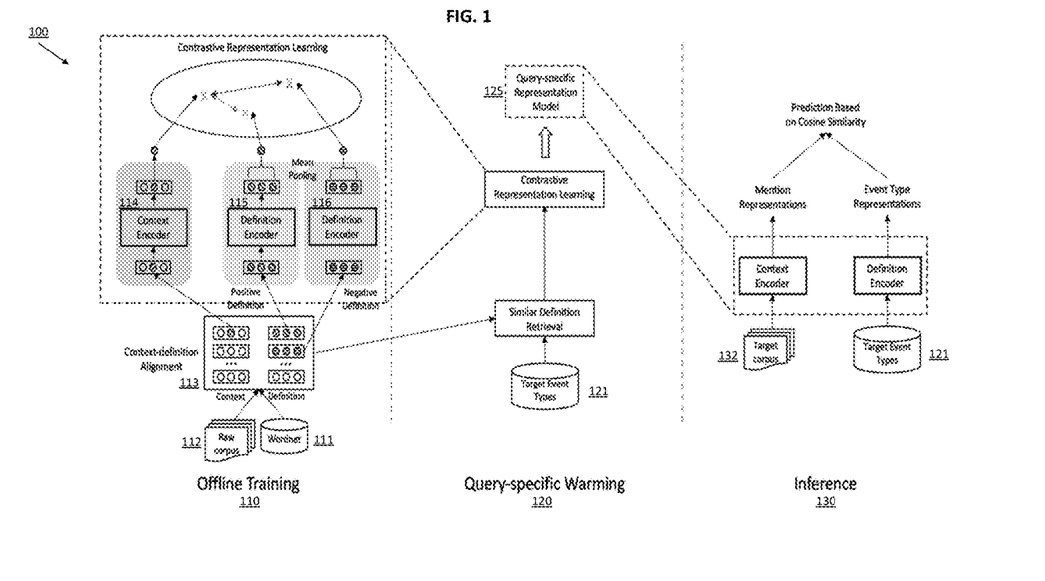
FIG. 1 illustrates a three-stage framework for event extraction, according to some embodiments.

FIG. 1 is diagram that illustrates the three-stage event representation learning framework 100, according to some embodiments. As shown in FIG. 1 the learning framework 100 includes three stages: Offline Training 110, Query-specific Warming 120, and Inference 130.

In some embodiments during Offline Training 110 all verbal synsets from the WordNet 111 ontology are selected to form an open-world event definition set. In total 13, 814 event synsets may be collected. To collect large-scale alignment data between context definitions, a current state-of-the-art word sense disambiguation model is applied to raw corpus 112 to align tokens in the raw corpus 112 with their correct definitions at Context-definition Alignment 113. 10 context instances are selected for each synset to speed up the training process. As a result, 775,000 context-definition alignments are collected. The alignment data from the Context-definition Alignment 113 is used to train Context encoder 114, and definition encoders 115 and 116.

The goal of the context-definition alignment encoding is encoding the contextualized representation of the target mention and the sentence representation of the definition into the same embedding space and pushing them to be closer to each other because they should have similar semantic meanings. Specifically, learning frame work 100 denotes the pre-processed context-definition alignment set as T, where each instance $(S,i,j,D) \in T$ contains context sentence S, which is a list of tokens w1S,w2S, ... , wnS, target word starting position i, target word ending position1 j, and a definition sentence D, which is also a list of tokens w1D, w2D, ... , wmD. The framework 100 follows the standard approach to get the contextualized word representation as the mean pooling of all sub-token representations. For the sentence encoding, the framework 100 chooses to use the average representation of all tokens. Following the contrastive learning framework, during this step, the framework 100 optimizes the marginal ranking loss.

In some embodiments, during Query-specific Warming 120 the model 125 briefly understands how to project the contextualized event mentions and corresponding definitions into similar positions in the embeddings. However, the model's capability of distinguishing similar definitions is still limited because the previous negative sampling strategy does not encourage such capabilities. The framework 100 introduces an additional warming phase to help models 125 learn the minor difference between similar definitions to address this issue. Similar to how human beings understand new concepts by recalling relevant knowledge, we also retrieve relevant knowledge from Target Event Types 121 to further fine-tune the model. Specifically, assume that the set of interested event definitions is D⁻, for each D⁻∈D⁻, we first retrieve the most similar definition from the original definition set.

In some embodiments, during Inference 130 the framework 100 computes the representation for each candidate event mention in and target event type descriptions. After that, for each candidate mention, we compute its cosine similarity with all the target event type representations. If the largest similarity is larger than a threshold t, this mention is identified and labeled as the most similar event type.

Figure 2:
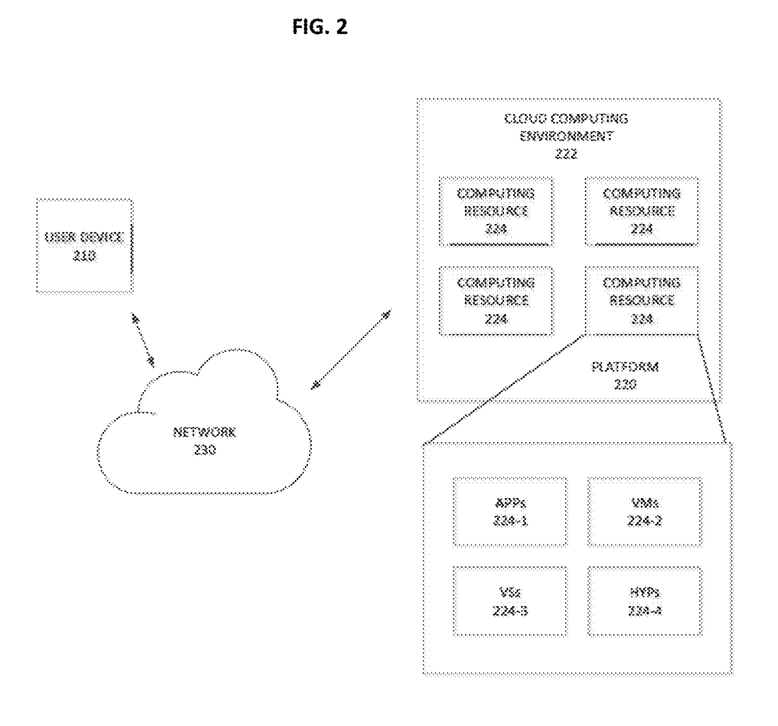
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a platform 220, and a network 230. Devices of environment 200 may interconnect via wired connections, wireless connections, or a combination of wired and wireless connections.

User device 210 includes one or more devices capable of receiving, generating, storing, processing, and/or providing information associated with platform 220. For example, user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 210 may receive information from and/or transmit information to platform 220.

Platform 220 includes one or more devices capable of performing hierarchical image processing, as described elsewhere herein. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 is not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc. services that do not require end-user (e.g., user device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210 and/or sensor device 220. Application 224-1 may eliminate a need to install and execute the software applications on user device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
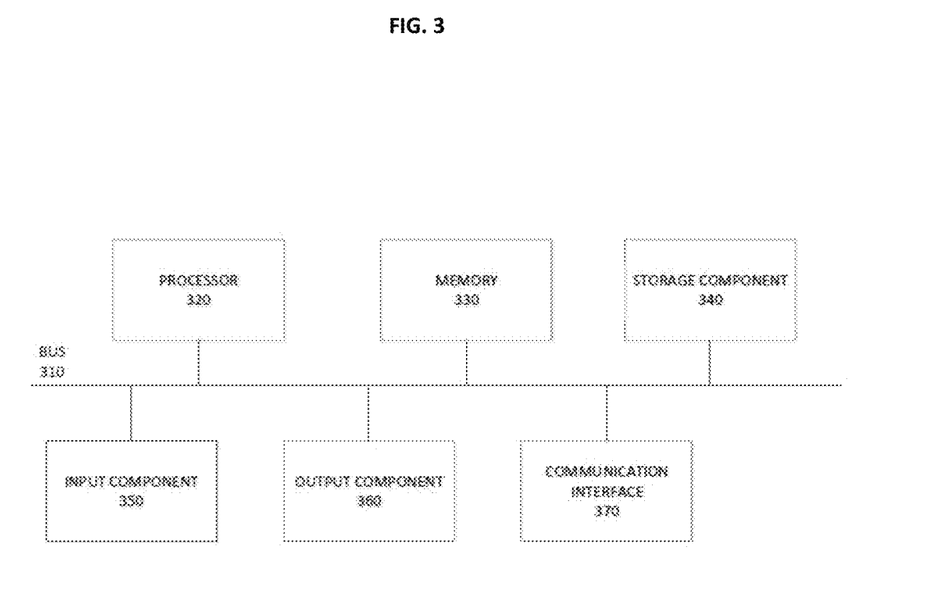
FIG. 3 is a diagram of example components of one or more devices, according to some embodiments.

FIG. 3 is a diagram of example components of a device 300. Device 300 may correspond to user device 210 and/or platform 220. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
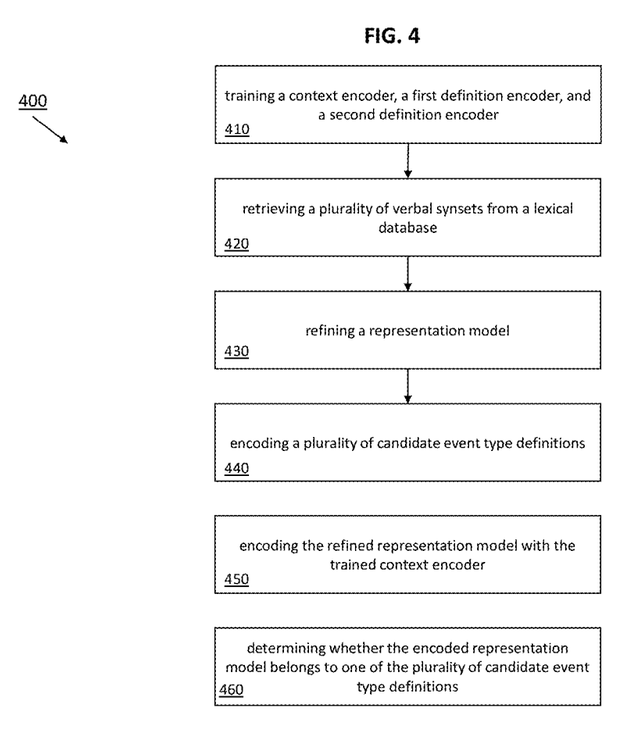
FIG. 4 is a flowchart of an example process for zero-shot event extraction, according to some embodiments.

As described above. FIG. 4 is a flow chart of an example process for performing a zero-shot event extraction method. In some implementations, one or more process blocks of FIG. 4 may be performed by platform 220. In some implementations, one or more process blocks of FIG. 4 may be performed by another device or a group of devices separate from or including platform 220, such as user device 210.

As shown in FIG. 4, process 400 may include training a context encoder, a first definition encoder, and a second definition encoder with auto extracted context-definition alignment data (block 410).

As further shown in FIG. 4, the process 400 may further include retrieving a plurality of verbal synsets from a lexical database (block 420).

As further shown in FIG. 4, the process 400 may further include refining a representation model based on the context-definition alignment data and the plurality of verbal synsets (block 430).

As further shown in FIG. 4, the process 400 may further include encoding a plurality of candidate event type definitions (block 440).

As further shown in FIG. 4, the process 400 may further include encoding the refined representation model with the trained context encoder (block 450).

As further shown in FIG. 4, the process 400 may further include determining whether the encoded representation model belongs to one of the plurality of candidate event type definitions based on a cosine similarity between the encoded representation model, the trained context encoder, the first trained definition encoder, and the second trained definition encoder (block 460).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
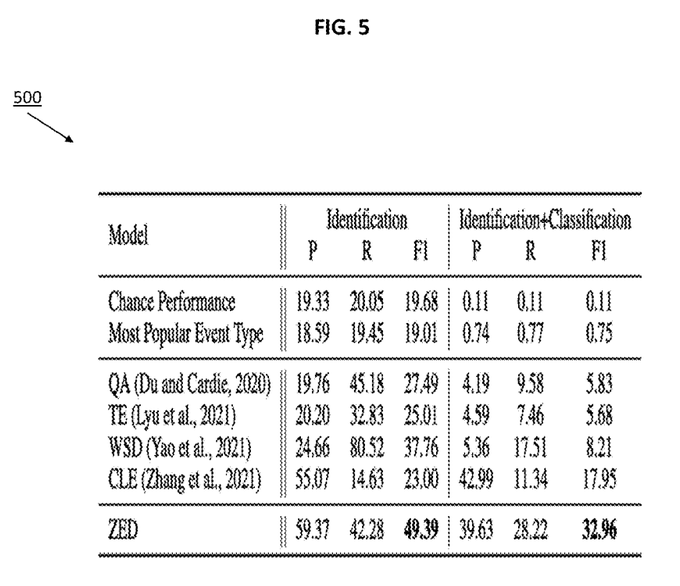
FIG. 5 depicts TABLE 1, which presents a performance comparison on benchmark datasets, according to some embodiments.

The zero-shot performance of all models is presented in Table 500 of FIG. 5. According to Table 500 all models significantly outperform the naive baselines even though they do not use any annotations. This observation shows that current deep models can indeed learn rich semantics that could generalize outside of their original training goal. The overall performance of pre-trained QA, TE, and WSD models is not satisfying because they suffer from the domain shifting. For example, even current deep-model driven QA models have surpassed human performance on several leaderboards, they are still not ready to be used as a general QA model for solving tasks that requires deep understanding, such as zero-shot event extraction.

Compared with other methods, Contextualized label embedding achieves lower identification F1 but higher classification accuracy, which aligns with the original observation in previous work. The reason behind this is that due to the cone property of the BERT representation (i.e., most of the token representations of BERT are grouped in a small region), it is tough to determine the cosine similarity boundary of whether an event mention fits a specific event type. As a result, even though CLE could accurately identify high-confident mentions, it cannot handle boundary ones very well. Compared with baseline methods, ZED could perform better on both the identification and classification tasks. The main reason is that we are using definitions to model the label semantics, which is more accurate than a single word.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local region network, a wide region network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local region network (LAN) or a wide region network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, implement the operations specified in the flowchart and/or block diagram block or blocks. These computer readable program instructions may also be stored in a computer readable storage medium that may direct a computer, a programmable data processing apparatus, and/or other devices to operate in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the operations specified in the flowchart and/or block diagram block or blocks.

The flowchart and block diagrams in the figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical operation(s). The method, computer system, and computer readable medium may include additional blocks, fewer blocks, different blocks, or differently arranged blocks than those depicted in the Figures. In some alternative implementations, the operations noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified operations or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method for zero-shot event extraction, performed by a computer device, the method comprising:
   obtaining a raw corpus from storage and retrieving a plurality of verbal synsets from a lexical database;
   generating auto extracted context-definition alignment data by applying a word sense disambiguation model to the raw corpus to align a plurality of tokens in a plurality of context sentences in the raw corpus with correct definitions based on the plurality of verbal synsets;
   generating a representation model by training a context encoder, a first definition encoder, and a second definition encoder with the auto extracted context-definition alignment data, wherein:
      the context encoder is trained to generate an embedded mention representations from target mentions by encoding contextualized representations of the target mentions into an embedding space,
      the first definition encoder is trained to generate positive embedded event type representations from positive event type definitions corresponding to the target mentions by encoding a first plurality of sentence representations of the positive event type definitions into the embedding space, and
      the second definition encoder is trained to generate negative embedded event type representations from negative event type definitions corresponding to the target mentions by encoding a second plurality of sentence representations of the negative event type definitions into the embedding space;
   refining the representation model via contrastive learning based on similar definitions retrieved from a plurality of target event types and a plurality of hard negative examples to refine alignment of the embedded mention representations and the positive embedded event type representations in the embedding space;
   encoding plurality of target event type definitions based on the refined representation model with the trained first definition encoder to obtain a plurality of embedded target event type representations;
   obtaining, based on information transmitted from a user device, a target corpus from a document comprising text describing a plurality of events;
   encoding the target corpus based on the refined representation model with the trained context encoder to obtain a plurality of embedded candidate mention representations;
   determining whether an embedded candidate mention representation corresponds to a first embedded target event type representation based on computing a cosine similarity between the embedded candidate mention representation and the first embedded target event type representation;
   labeling a candidate mention in the target corpus based on determining the embedded candidate mention representation corresponds to the first embedded target event type representation; and
   based on one or more candidate mentions in the target corpus being labeled, transmitting to the user device, based on the one or more labeled candidate mentions, at least one of:
      a relationship between events described in the target corpus,
      a schema of a type of a first event described in the target corpus, or
      an inference regarding an occurrence of a second event not expressly named in the target corpus.

2. The method according to claim 1, wherein the lexical database is WordNet, and the plurality of verbal synsets are selected from a WordNet ontology.

3. The method according to claim 1, further comprising randomly selecting 10 context instances for each synset to speed up the training process.

4. The method according to claim 1, further comprising computing the representation model for one or more candidate event-mentions in one or more target event type descriptions.

5. The method according to claim 4, wherein the determining whether the embedded candidate mention representation corresponds to the first embedded tar et event type representation comprises:
   identifying a largest cosine similarity between the embedded candidate mention representation and the plurality of embedded target event type representations; and
   determining whether the largest cosine similarity is larger than a predetermined threshold, and
   wherein the labeling the candidate mention comprises, based on the largest cosine similarity being larger than the predetermined threshold, labeling the candidate mention as being an event type corresponding to a second embedded target event type representation associated with the largest cosine similarity.

6. The method according to claim 1, wherein performing the determining whether the embedded candidate mention representation corresponds to the first embedded target event type representation, for a plurality of embedded candidate mentions, has a time complexity of O(N+T), wherein N is a number of candidate mentions in the target corpus, and T is a number of the plurality of target event type definitions.

7. The method according to claim 1, wherein the generating the representation model comprises:
obtaining contextualized word representations based on computing a mean pooling of all sub-token representations for a plurality of tokens corresponding to a target mention; and
generating sentence representations of positive event type definitions and negative event type definitions by computing an average representation of all tokens in a corresponding definition sentence.

8. The method according to claim 1, wherein the refining the representation model comprises applying a contrastive learning framework to optimize a marginal ranking loss,
wherein the positive embedded event type representations are optimized to be closer in the embedding space to the embedded mention representations, and
wherein the negative embedded event type representations are optimized to be further away in the embedding space from the embedded mention representations.

9. An apparatus comprising:
at least one memory configured to store program code; and
at least one processor configured to read the program code and operate as instructed by the program code, the program code comprising:
first obtaining code configured to cause the at least one processor to obtain a raw corpus from storage and retrieve a plurality of verbal synsets from a lexical database;
generating code configured to cause the at least one processor to generate auto extracted context-definition alignment data by applying a word sense disambiguation model to the raw corpus to align a plurality of tokens in a plurality of context sentences in the raw corpus with correct definitions based on the plurality of verbal synsets;
training code configured to cause the at least one processor to generate a representation model by training a context encoder, a first definition encoder, and a second definition encoder with the auto extracted context-definition alignment data, wherein:
the context encoder is trained to generate an embedded mention representations from target mentions by encoding contextualized representations of the target mentions into an embedding space,
the first definition encoder is trained to generate positive embedded event type representations from positive event type definitions corresponding to the target mentions by encoding a first plurality of sentence representations of the positive event type definitions into the embedding space, and
the second definition encoder is trained to generate negative embedded event type representations from negative event type definitions corresponding to the target mentions by encoding a second plurality of sentence representations of the negative event type definitions into the embedding space;
refining code configured to cause the at least one processor to refine the representation model via contrastive learning, based on similar definitions retrieved from a plurality of target event types and a plurality of hard negative examples to refine alignment of the embedded mention representations and the positive embedded event type representations in the embedding space;
first encoding code configured to cause the at least one processor to encode a plurality of target event type definitions based on the refined representation model with the trained first definition encoder to obtain a plurality of embedded target event e presentations;
second obtaining code configured to cause the at least one processor to obtain, based on information transmitted from a user device, a target corpus from a document comprising text describing a plurality of events;
second encoding code configured to cause the at least one processor to encode the target corpus based on the refined representation model with the trained context encoder to obtain a plurality of embedded candidate mention representations;
determining code configured to cause the at least one processor to determine whether embedded candidate mention representation corresponds to a first embedded target event type representation based on computing a cosine similarity between the embedded candidate mention representation and the first embedded target event type representation;
labeling code configured to cause at least one of the at least one processor to label a candidate mention in the target corpus based on determining the embedded candidate mention representation corresponds to the first embedded target event type representation; and
based on one or more candidate mentions in the target corpus being labeled, transmit to the user device, based on the one or more labeled candidate mentions, at least one of:
a relationship between events described in the target corpus,
a schema of a type of a first event described in the target corpus, or
an inference regarding an occurrence of a second event not expressly named in the target corpus.

10. The apparatus according to claim 9, wherein the lexical database is WordNet, and the plurality of verbal synsets are selected from a WordNet ontology.

11. The apparatus according to claim 9, further comprising selecting code configured to cause the at least one processor to randomly select 10 context instances for each synset to speed up the training process.

12. The apparatus according to claim 9, further comprising computing code configured to cause the at least one processor to compute the representation model for one or more candidate event-mentions in one or more target event type descriptions.

13. The apparatus according to claim 12, wherein the determining code is configured to cause the at least one processor to:
identify a largest cosine similarity between the embedded candidate mention representation and the plurality of embedded target event type representations; and
determine whether the largest cosine similarity is larger than a predetermined threshold, and
wherein the labeling code is configured to cause at least one of the at least one processor to, based on the largest cosine similarity being larger than the predetermined threshold, label the candidate mention as being an event type corresponding to a second embedded target event type representation associated with the largest cosine similarity.

14. The apparatus according to claim 9, wherein the determining code is configured to cause at least one of the at least one processor to determine whether the embedded candidate mention representation corresponds to the first embedded target event type representation, for a plurality of embedded candidate mentions, and
wherein the determining code has a time complexity of O(N+T), wherein N is a number of candidate mentions in the target corpus, and T is a number of the plurality of target event type definitions.

15. The apparatus according to claim 9, wherein the training code is configured to cause at least one of the at least one processor to:
obtain contextualized word representations based on computing a mean pooling of all sub-token representations for a plurality of tokens corresponding to a target mention; and
generate sentence representations of positive event type definitions and negative event type definitions by computing an average representation of all tokens in a corresponding definition sentence.

16. The apparatus according to claim 9, wherein the refining code is configured to cause at least one of the at least one processor to apply a contrastive learning framework to optimize a marginal ranking loss,
wherein the positive embedded event type representations are optimized to be closer in the embedding space to the embedded mention representations, and
wherein the negative embedded event type representations are optimized to be further away in the embedding space from the embedded mention representations.

17. A non-transitory computer-readable storage medium, storing instructions, which, when executed by at least one processor, cause the at least one processor to:
obtain a raw corpus from storage and retrieve a plurality of verbal synsets from a lexical database;
generate auto extracted context-definition alignment data by applying a word sense disambiguation model to the raw corpus to align a plurality of tokens in a plurality of context sentences in the raw corpus with correct definitions based on the plurality of verbal synsets;
generate a representation model by training a context encoder, a first definition encoder, and a second definition encoder with the auto extracted context-definition alignment data, wherein:
the context encoder is trained to generate an embedded mention representations from target mentions by encoding contextualized representations of the target mentions into an embedding space,
the first definition encoder is trained to generate positive embedded event type representations from positive event type definitions corresponding to the target mentions by encoding a first plurality of sentence representations of the positive event type definitions into the embedding space, and
the second definition encoder is trained to generate negative embedded event type representations from negative event type definitions corresponding to the target mentions by encoding a second plurality of sentence representations of the negative event type definitions into the embedding space;
refine the representation model via contrastive learning based on similar definitions retrieved from a plurality of target event types and a plurality of hard negative examples to refine alignment of the embedded mention representations and the positive embedded event type representations in the embedding space;
encode a plurality of target event type definitions based on the refined representation model with the trained first definition encoder to obtain a plurality of embedded target event type representations;
obtain, based on information transmitted from a user device, a target corpus from a document comprising text describing a plurality of events;
encode the target corpus based on the refined representation model with the trained context encoder to obtain a plurality of embedded candidate mention representations;
determine whether an embedded candidate mention representation corresponds to a first embedded target event type representation based on computing a cosine similarity between the embedded candidate mention representation and the first embedded target event type representation;
label a candidate mention in the target corpus based on determining the embedded candidate mention representation corresponds to the first embedded target event type representation; and
based on one or more candidate mentions in the target corpus being labeled, transmit to the user device, based on the one or more labeled candidate mentions, at least one of:
a relationship between events described in the target corpus,
a schema of a type of a first event described in the target corpus, or
an inference regarding an occurrence of a second event not expressly named in the target corpus.

18. The non-transitory computer-readable storage medium according to claim 17, wherein the lexical database is WordNet, and the plurality of verbal synsets are selected from a WordNet ontology.

* * * * *